United States Patent [19]

Tanioka

[11] Patent Number: 4,626,901
[45] Date of Patent: Dec. 2, 1986

[54] IMAGE PROCESSING APPARATUS USING MULTIPLE DITHER MATRICES

[75] Inventor: Hiroshi Tanioka, Tokyo, Japan

[73] Assignee: Canon Kabushiki Kaisha, Tokyo, Japan

[21] Appl. No.: 820,826

[22] Filed: Jan. 21, 1986

Related U.S. Application Data

[63] Continuation of Ser. No. 543,447, Oct. 19, 1983, abandoned.

[30] Foreign Application Priority Data

Oct. 27, 1982 [JP] Japan ................................ 57-187363

[51] Int. Cl.$^4$ ............................................. H04N 1/46
[52] U.S. Cl. ...................................... 358/75; 358/296; 358/298
[58] Field of Search .......................... 358/75, 296, 298

[56] References Cited

U.S. PATENT DOCUMENTS

| | | | |
|---|---|---|---|
| 3,911,480 | 10/1975 | Brucker | 358/75 |
| 4,084,183 | 4/1978 | Keller et al. | 358/75 |
| 4,350,996 | 9/1982 | Rosenfeld | 358/75 |
| 4,419,690 | 12/1983 | Hammes | 358/75 |

*Primary Examiner*—E. A. Goldberg
*Assistant Examiner*—Patrick W. Foster
*Attorney, Agent, or Firm*—Fitzpatrick, Cella Harper & Scinto

[57] ABSTRACT

An image processing apparatus comprises means for reading a text image to produce an image data and means for digitizing the image data. The digitizing means includes dither conversion means for dither-converting the image data and input means for inputting a signal to the dither conversion means to determine a parameter for dither conversion in accordance with a screen angle of the text image.

8 Claims, 20 Drawing Figures

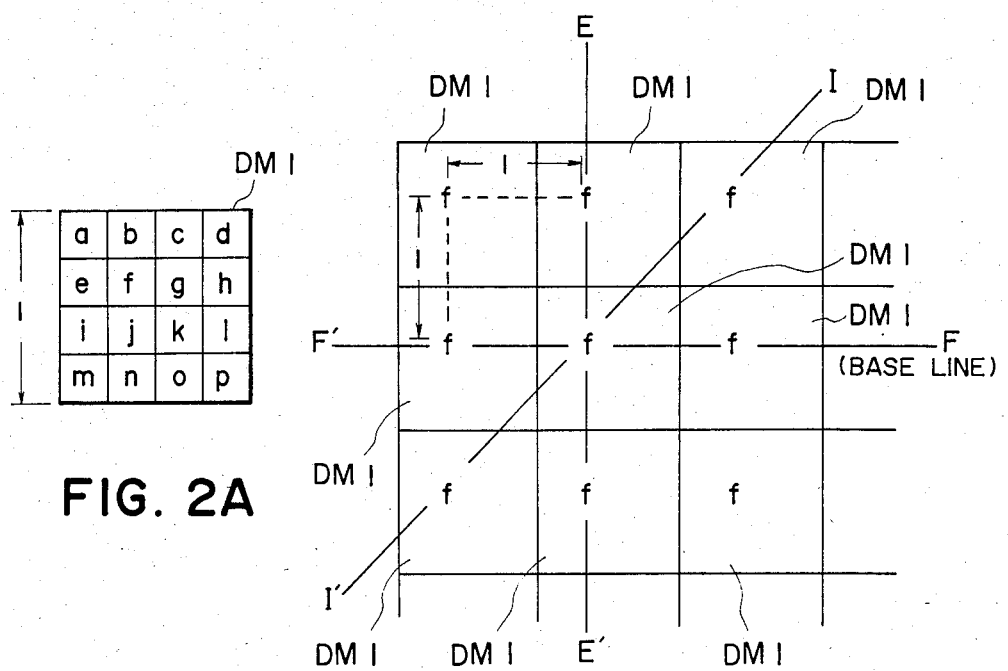
FIG. 2A
FIG. 2B
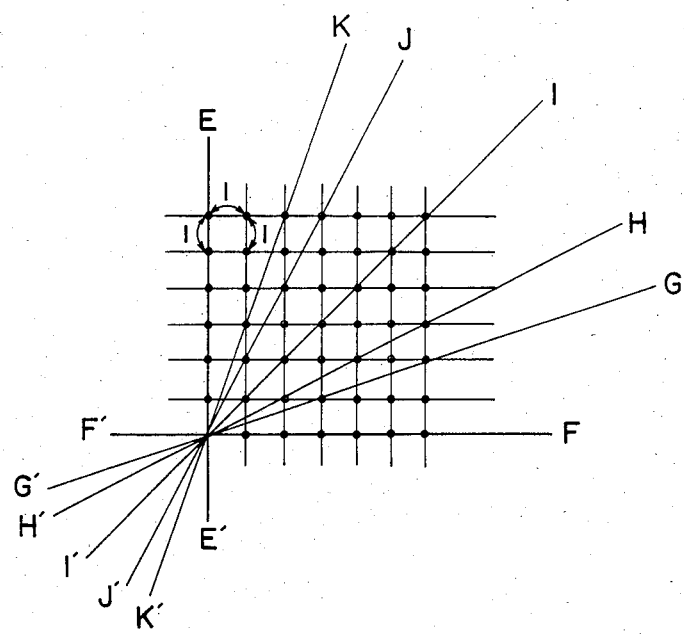
FIG. 2C

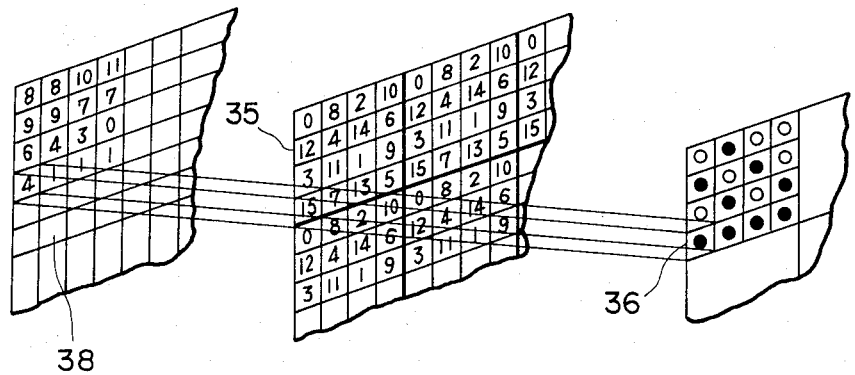
FIG. IIA
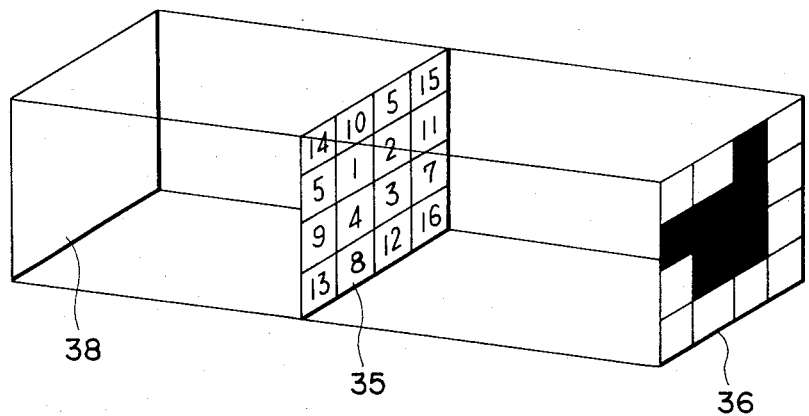
FIG. IIB

IMAGE PROCESSING APPARATUS USING MULTIPLE DITHER MATRICES

This application is a continuation of application Ser. No. 543,447 filed Oct. 19, 1983, now abandoned.

BACKGROUND OF THE INVENTION

1. Field of the Invention

The present invention relates to an image processing apparatus for reproducing an image such as a dotted text.

2. Description of the Prior Art

In an image processing apparatus which uses a dither method, a Moire pattern is produced in reproducing a text of a uniform density due to an angular difference between a screen angle of a dotted text and a repetitive array angle of a dither matrix. As a result, a noisy image is reproduced.

In order to resolve the above problem, the resolution of the image processing apparatus may be increased to be smaller than a pixel of a dot. For example, for a color print having eight screen lines per millimeter, in order to reproduce an image with 64 degrees of density, a text may be read with a resolution of $(\frac{1}{8} \times \frac{1}{8})^2$ mm$^2$ and the text image may be discriminated at a constant threshold.

However, it is difficult to attain such a high resolution with presently available technology. Further, it is difficult to apply the above method in which the image is discriminated as the constant threshold to digitally display the image for a text other than dotted text to reproduce a multi-tone image.

SUMMARY OF THE INVENTION

It is an object of the present invention to eliminate the above shortcomings.

It is another object of the present invention to provide an image processing apparatus which suppresses a Moire pattern in reproducing a text image by using a dither method to reproduce a sharp multi-tone image.

It is another object of the present invention to provide an image processing apparatus which can reproduce an image of a high quality with a simple construction.

It is another object of the present invention to provide an image processing apparatus in which can select a parameter of dither conversion depending on a screen angle of an input image.

It is a further object of the present invention to provide an image processing apparatus which can reproduce an image with a suppressed Moire pattern.

The other objects of the present invention will be apparent from the following description of the invention taken in conjunction with the accompanying drawings, as well as the appended claims.

BRIEF DESCRIPTION OF THE DRAWINGS

FIGS. 2A to 2C show charts illustrating array angles of dither matrices,

FIGS. 3A, 3B and 3C to 5A, 5B and 5C represent various dither matrices used in the present invention, FIGS. 11A and 11B show charts for explaining a dither method and a density pattern method.

DETAILED DESCRIPTION OF THE PREFERRED EMBODIMENTS

Figure 1:
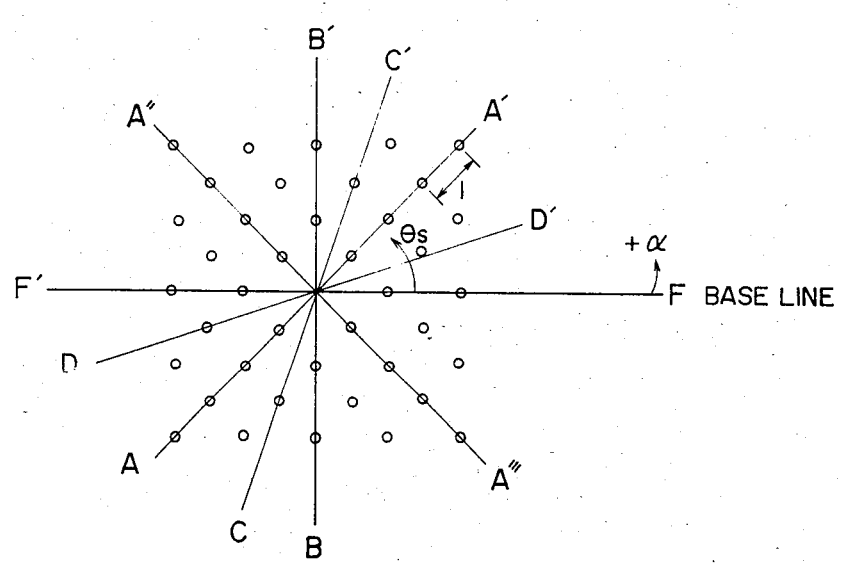
FIG. 1 shows a chart illustrating a screen angle of a dotted image.

FIG. 1 shows a chart for explaining a screen angle a dotted image. Each of dot element is shown by a dot (°) and an array of the dot elements is at an angle of 45 degrees counterclockwise relative to a base line F—F'. Such an array of dot elements is called a screen and the angle of the screen is indicated by the phrase "screen angle of 45 degrees". Thus, in FIG. 1, a line A—A' represents the screen angle. Assuming that a distance between the dot elements on the line A—A' is "1", distances between the dot elements on lines D—D', A—A', C—C' and B—B', respectively, and angles θs of the respective lines are represented as shown in Table 1.

TABLE 1

| Line | Distance | angles θs of lines (degrees) |
|------|----------|------------------------------|
| D-D' | 2.2 | 18.5 |
| A-A' | 1 | 45 |
| C-C' | 2.2 | 71.5 |
| B-B' | 1.4 | 90 |

The distance between the dots (dot elements or pixels) of the screen is sometimes called an array strength. When the distance betwen the dot elements is equal to "1", the array is a strongest array. The angle of the screen under this condition is called a screen angle.

In general, when two parallel line groups interset to and change each other with a certain angle, a Moire pattern is produced. Assuming that $P_1$ is the distance between the lines in the first parallel line group, $P_2$ is the angle between the lines in the second parallel line group and $\theta$ is the angle of intersection, then a pitch P of the Moire pattern is represented by $$p = \frac{p_1 p_2}{\sqrt{p_1^2 + p_2^2 - 2p_1 p_2 \cos\theta}} \quad (0° \leq \theta \leq 90°)$$

By applying the above two parallel line groups to the screen of the dotted pattern of FIG. 1, $p_1$ corresponds to the line-to-line distance (mutual distance) of the screen in the dotted pattern and $p_2$ corresponds to a dimension of a basic dither matrix to be described later. The angle of intersection $\theta$ corresponds to a difference between a repetitive array andle $\theta$d of the basic dither matrix and a screen angle $\theta$s of the dotted pattern.

The screen of the dotted pattern can be considered to comprise orthogonal parallel line groups, and the basic dither matrix can also be considered as orthogonal parallel line groups. Thus, the resulting Moire pattern comprises those two line groups.

The larger the pitch p of the Moire pattern is, the more noisy is the image and the more uncomfortable it is to a human being's vision.

In order to reduce the pitch p of the Moire pattern, at least one of $p_1$ and $p_2$ is to be reduced or the angle of intersection $\theta$ is to be brought to close to 90 degrees. However, since the line-to-line distance $p_1$ of the screen is determined by the text image and the dimension of the basic dither matrix (hereinafter simply referred to as dither matrix) depends on the tone, it is not practical to reduce $p_1$ or $p_2$.

In order to bring the angle of intersection $\theta$ to 90 degrees, it is desirable to shift the repetitive array angle of the dither matrix in FIG. 1 by 90 degrees relative to the screen angle. However, since the screen and the dither matrix of the dotted image are arranged in matrix, there exists a strong array of the dot elements having the mutual distance of "1" on a line A"—A" which is 90 degrees shifted from a line A—A'. Thus, even if the repetitive array angle of the dither matrix were shifted by 90 degrees relative to the screen angle, it would be the same as if it were not shifted.

Accordingly, the possible range of the angle of intersection $\theta$ is $0 \leq \theta \leq 45°$ and the Moire pattern is smallest when $\theta = 45°$.

As seen from Table 1, there exist an array of distance 1.4 on a line B—B', an array of distance 2.2 on a line C—C' and an array of distance 2.2 on a line D—D'. Accordingly, interferences occur between the dither matrix and those arrays. While those interferences are smaller than the interference of the array on the line A—A', they should not overlap with the repetitive array angle of the basic dither matrix.

FIGS. 2A-2C illustrate the repetitive array angle of the dither matrix DM1. The 4 rows by 4 columns dither matrix DM1 has 16 thresholds a-p as shown in FIG. 2A. It is repetitively scanned horizontally and vertically on the text image as shown in FIG. 2B. Considering the threshold f, for example, a line F—F' connecting a plurality of thresholds f scattered horizontally can be considered as a base line.

FIG. 2C shows various array lines rotated clockwise around the base line F—F'. The dots (°) indicate the thresholds f of the dither matrix shown in FIG. 2A.

As seen from FIG. 2C, the array lines E—E' and F—F' are the strongest array lines having the threshold distance of "1". Thus, the repetitive array angle of the dither matrix is represented by the array lines F—F', G—G', H—H', I—I', J—J' and K—K'. Table 2 below shows a relation between the repetitive array angle $\theta d$ of the dither matrix DM1 shown in FIG. 2A and the strength of the array, that is, the threshold distance.

TABLE 2

| Array Line | Distance | $\theta d$ (degrees) |
|---|---|---|
| G-G' | 3.2 | 18.5 |
| H-H' | 2.2 | 26.5 |
| I-I' | 1.4 | 45 |
| J-J' | 2.2 | 63.5 |
| K-K' | 3.2 | 71.5 |
| E-E' | 1 | 90 |

By digitizing the dotted image shown in FIG. 1 by applying the dither matrix DM1 shown in FIG. 2, a very strong Moire pattern is created when the screen angle and the repetition array angle of the dither matrix are equal. For example, the strongest array line A—A' of the dotted image coincides with the array line I—I' of the dither matrix (which is the next to the strongest array line), and similarly the line B—B' of the dotted image coincides with the array line E—E', the line D—D' of the dotted image coincides with the array line G—G' and the line C—C' of the dotted image coincides with the array line K—K'. Accordingly, the very strong Moire pattern is created.

Figure 3A:
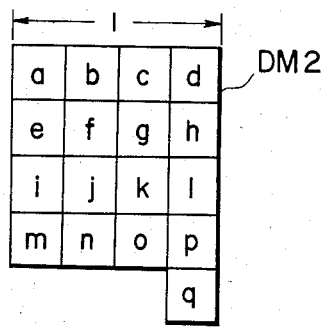
Figure 3B:
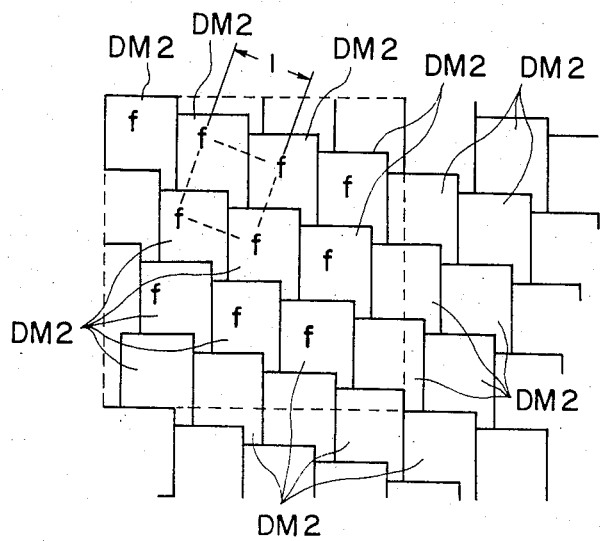
Figure 3C:
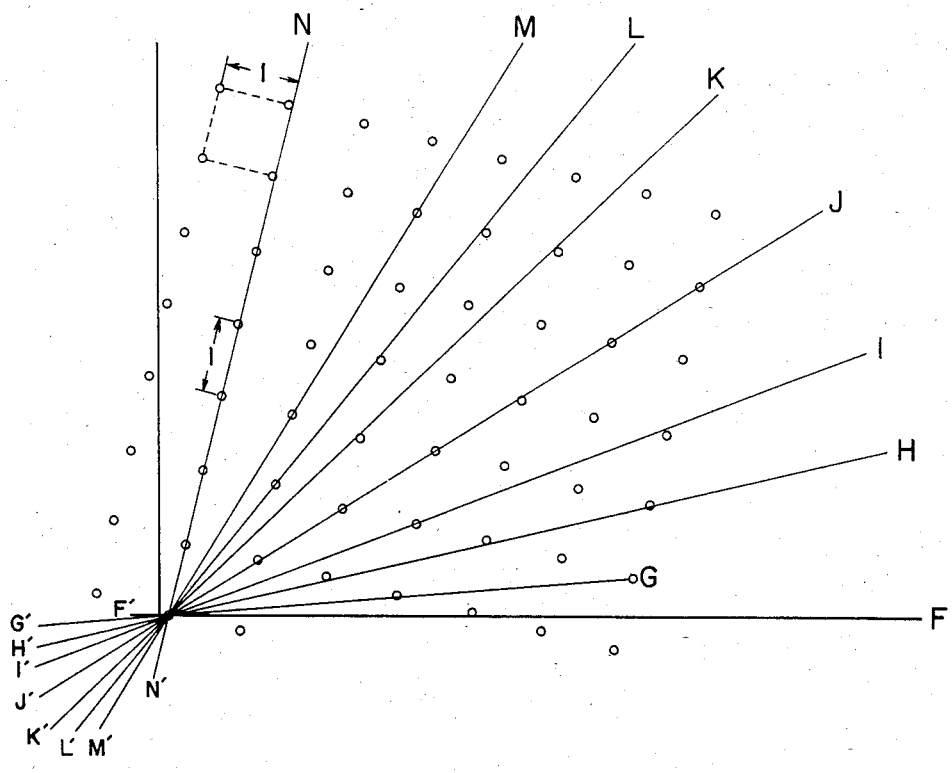

Now, the dither matrix DM2 shown in FIG. 3A is applied to the text of the dotted image shown in FIG. 1. In FIG. 3A, a-q denote the various thresholds in the dither matrix DM2. The dots (°) in FIG. 3C show the thresholds f of the dither matrix DM2 shown in FIG. 3A. FIG. 3B shows the array of the dither matrix DM2 of FIG. 3A. The relation between the repetitive array angle $\theta d$ (degrees) and the strength of the array, that is, the threshold distance of such a dither matrix, is shown in Table 3.

TABLE 3

| Array Line | Distance | $\theta d$ (degrees) |
|---|---|---|
| G-G' | 3.2 | 4.4 |
| H-H' | 2.2 | 12.5 |
| I-I' | 3.6 | 19.6 |
| J-J' | 1.4 | 31 |
| K-K' | 3.7 | 42 |
| L-L' | 2.2 | 49.5 |
| M-M' | 3.2 | 57.5 |
| N-N' | 1 | 76 |

As seen from Table 3, the strongest array angle having the threshold distance of "1" is that of the array line N—N' and the angle $\theta d$ is equal to 76 degrees. Comparing it with the lines of the dotted image shown in Table 1, it is shifted by approximately 30° from the strongest array line A—A'. There exists no array whose repetitive array angle $\theta d$ has a distance of no greater than 3 and which coincides with the angle $\theta s$ of the lines shown in Table 1. Thus, by using the dither matrix DM2 shown in FIG. 3, the Moire pattern caused by the text of the dotted image having the screen angle of 45 degrees can be suppressed.

Figure 4A:
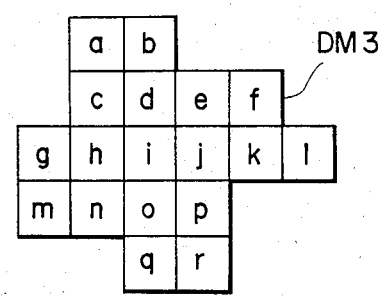
Figure 4B:
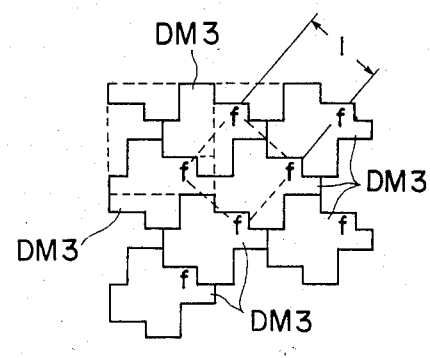
Figure 4C:
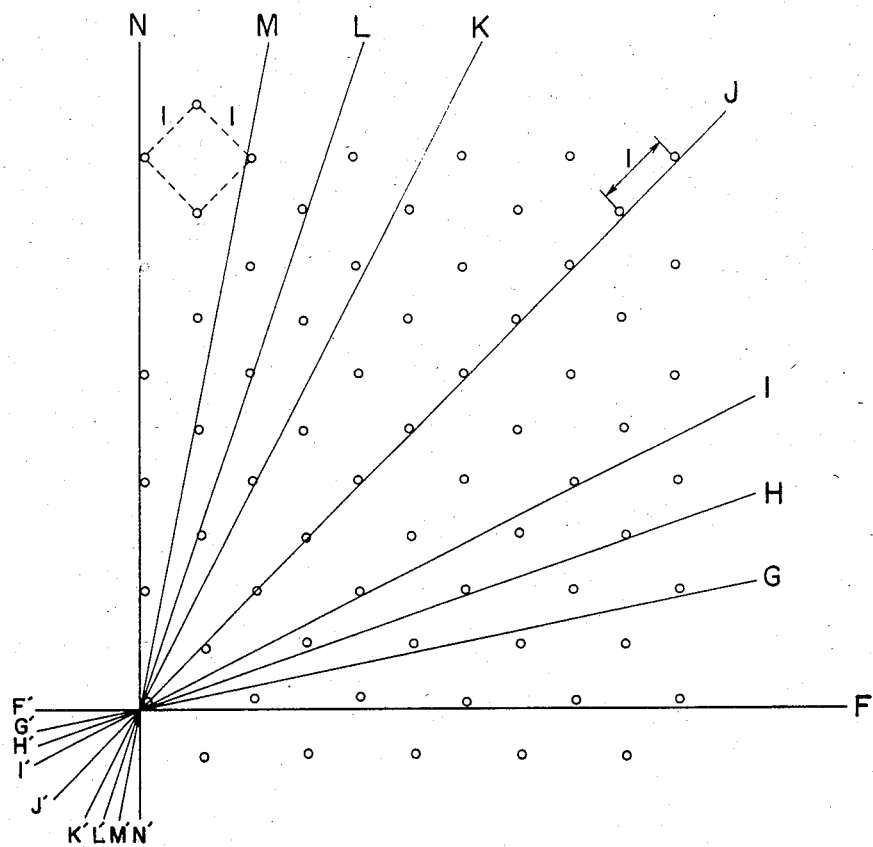

FIG. 4A shows a dither matrix DM3 in which the strongest array angle having the threshold distance of "1" is shifted by 45 degrees relative to a base line F—F'. In FIG. 4A, a to r denote various thresholds in the dither matrix. FIG. 4B shows an array of the dither matrix DM3 shown in FIG. 4A. Dots (°) in FIG. 4C show thresholds f of the dither matrix DM3 shown in FIG. 4A. The relation between the repetitive array angle of the dither matrix and the array strength, that is, the threshold distance, is shown in Table 4.

TABLE 4

| Array Line | Distance | $\theta d$ (degrees) |
|---|---|---|
| G-G' | 2.6 | 11.3 |
| H-H' | 2.2 | 16.7 |
| I-I' | 3.2 | 26.5 |
| J-J' | 1 | 45 |
| K-K' | 3.2 | 63.5 |
| L-L' | 2.24 | 71.5 |
| M-M' | 3.6 | 78.7 |
| N-N' | 1.45 | 90 |

In general, a multi-color text is reproduced by using yellow, magenta and cyan screens. Those three screens have different screen angles. Accordingly, when such a text is to be color-decomposed by filters and an image thereof is to be reproduced by the dither method, it is necessary to prepare dither matrices for the respective colors (screen angles) to suppress the Moire pattern. The screen angles usually used are 45 degrees shown in FIG. 1, and 15 degrees and 75 degrees. Table 5 below shows arrays of the dot elements having screen angles of 15 degrees and 75 degrees.

TABLE 5

| Screen Angles (degrees) | Distance | Angles $\theta s$ (degrees) of Lines |
|---|---|---|
| 15 | 1 | 15 |
|  | 2.2 | 41.5 |
|  | 1.4 | 60 |
|  | 2.2 | 78.5 |
| 75 | 2.2 | 11.5 |
|  | 1.4 | 30 |
|  | 2.2 | 48.5 |

TABLE 5-continued

| Screen Angles (degrees) | Distance | Angles θs (degrees) of Lines |
|---|---|---|
| | 1 | 75 |

As seen from Table 5, when the screen angle of the dotted image is 15 degrees, the strongest array occurs when θs=15°, and the next strongest array occurs when θs=60°. For those arrays or angles of lines, a possibility of interference with the dither matrix is high.

Similarly, when the screen angle of the dotted image is 75 degrees, the strongest array occurs when θs=75° and the next strongest array occurs when θs=30°. For those angles of lines, a possibility of interference with the dither matrix is high.

Referring again to FIG. 4 and Table 4, it is apparent from a comparison of Table 4 and Table 5 that the dither matrix DM3 shown in FIG. 4 has a sufficiently large effect of suppression of the Moire pattern for the texts of dotted images having the screen angles of 15 degrees and 75 degrees. This is proven by sequentially comparing the angles of lines of the dotted images having the strong array and the repetitive array angles of the dither matrix having the strong array.

Figure 5A:
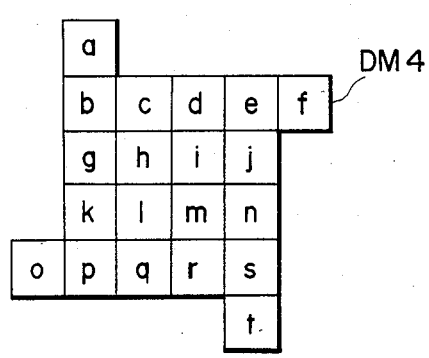
Figure 5B:
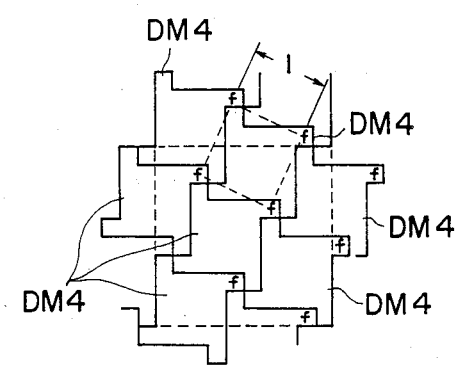
Figure 5C:
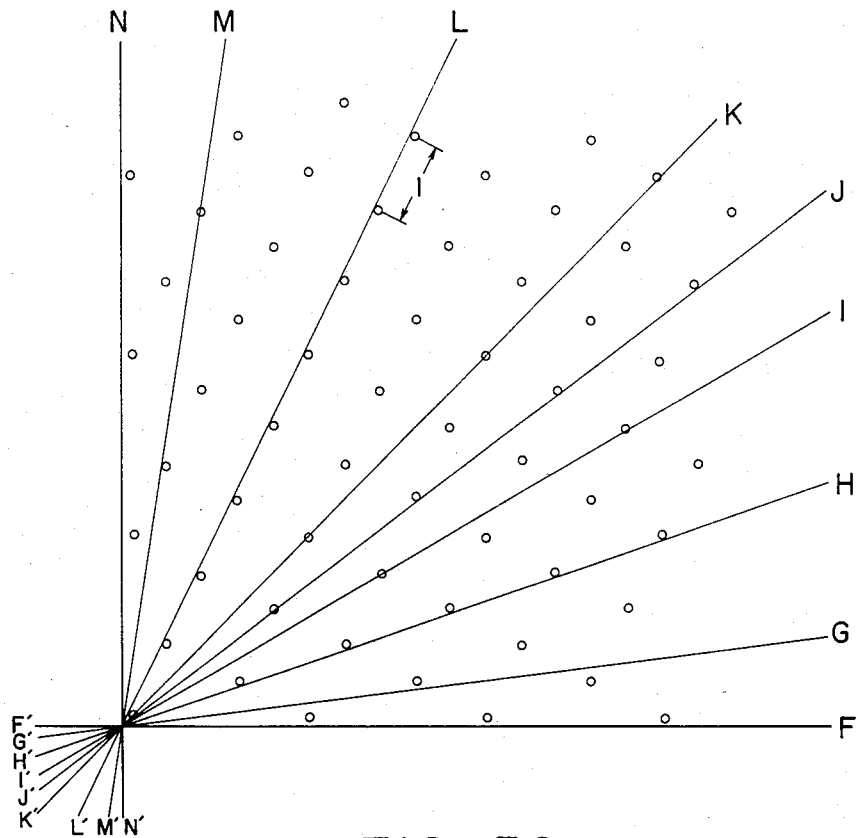

FIG. 5A shows a dither matrix DM4 in which the strongest array angle is shifted by 63.5 degrees relative to the base line F—F'. In FIG. 5A, a-t denote various thresholds in the dither matrix. FIG. 5B shows repetitive arrangement of the dither matrix DM4. Dots (°) in FIG. 5C show thresholds f of the dither matrix shown in FIG. 5A. Like the dither matrix shown in FIG. 4, the dither matrix of FIG. 5 has an effect of suppression of the Moire pattern for the screen angles of 15 degrees and 75 degrees by the same reason as that described in connection with FIG. 4. Table 6 below shows the relation between the array angle of the dither matrix DM4 and the array strength, that is, the threshold distance.

TABLE 6

| Array Line | Distance | θd (degrees) |
|---|---|---|
| G-G' | 3.5 | 7.1 |
| H-H' | 1.4 | 18.3 |
| I-I' | 3.5 | 30 |
| J-J' | 2.2 | 37 |
| K-K' | 3.2 | 45 |
| L-L' | 1 | 63.5 |
| M-M' | 3.2 | 82 |
| N-N' | 2.2 | 90 |

The dither matrix shown in FIG. 2 is a 4 rows by 4 columns matrix capable of representing 16 tones, and the dither matrix shown in FIG. 3 is a matrix which is capable of representing 17 tones and which has an equivalent dimension of 4.12 rows by 4.12 columns. Similarly, the dither matrices shown in FIGS. 4 and 5 are matrices which are capable of representing 18 tones and 20 tones, respectively, and which have equivalent dimensions of 4.24 rows by 4.24 columns and 4.47 rows by 4.47 columns, respectively. Accordingly, there are no great differences in the tonability and the resolution power between those dither matrices and they can be interchanged.

Figure 6:
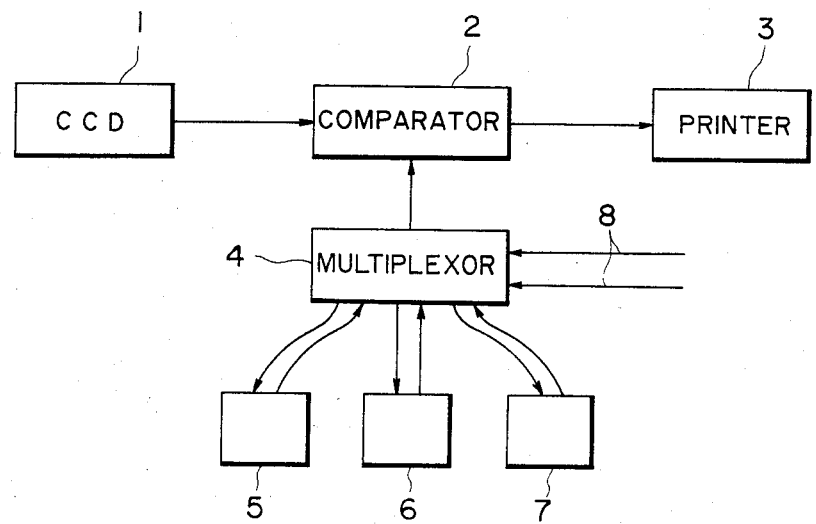
FIGS. 6 and 7 show circuit diagrams of embodiments of the present invention.

FIG. 6 shows a circuit diagram of one embodiment of the image reproducing apparatus of the present invention. Numeral 1 denotes a solid-state image pickup device such as CCD (charge coupled device) for reading the text image. Image data read by the CCD 1 is converted to a digital signal by an A/D converter (not shown) and is supplied to a comparator 2, which compares an output signal of three one of dither matrix signal generators 5, 6 and 7 selected by a multiplexer 4 with the output signal from the CCD 1 and supplies a binary dot print signal to a printer 3.

The dither matrix signal generators 5, 6 and 7 may be ROM's.

The dither matrix signal generators 5, 6 and 7 generate dither matrix signals of different repetitive array angles as shown in FIGS. 3, 4 and 5, respectively.

A selection signal 8 to be applied to the multiplexer 4 to select one of the dither matrices of different repetitive array angles in accordance with the read text image may be a color-decompose signal of a three-color filter. In this manner, one of the dither matrices is automatically selected in accordance with the filter (decomposed color) being used.

Figure 7:
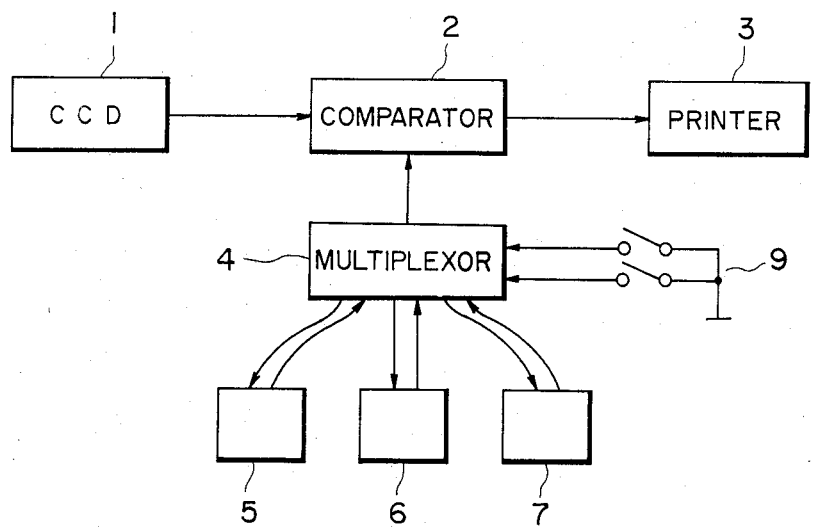

FIG. 7 shows another embodiment in which a manual selection switch 9 is used in place of the selection signal 8 of FIG. 6. In FIG. 7, an operator selects one of the dither matrices in accordance with the text image (for example, colors of a color image). The other operations are identical to those of FIG. 6.

Figure 8:
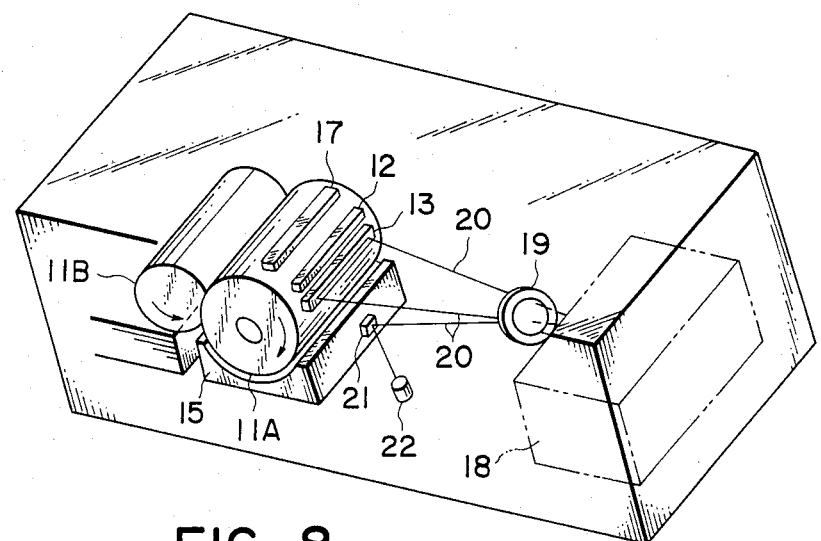
FIGS. 8 to 10 show laser beam printers.
Figure 9:
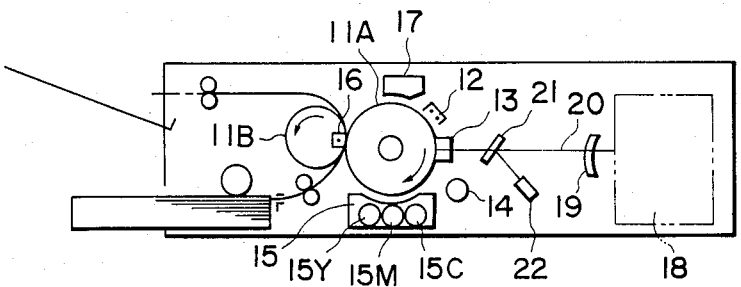
Figure 10:
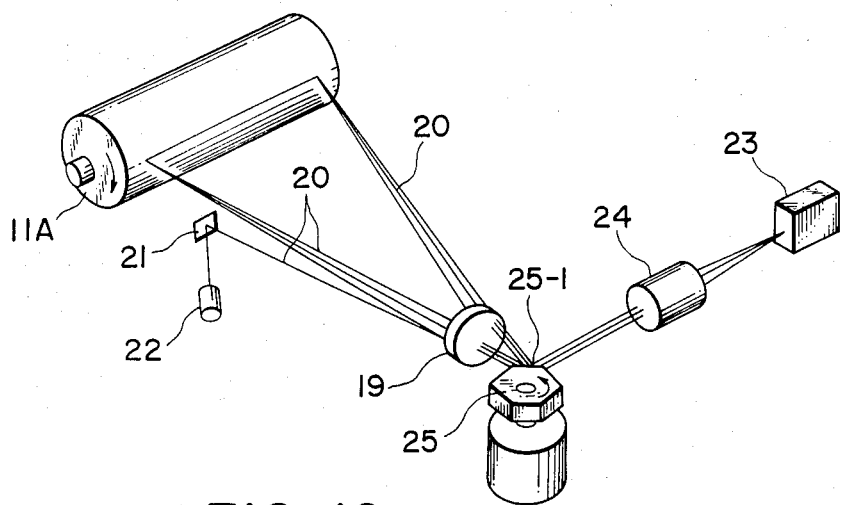

As an example of the printer 3, a laser beam printer is shown in FIGS. 8, 9 and 10. In FIGS. 8 and 9, numeral 11A denotes a photosensitive drum and numeral 11B denotes a transfer drum. They are rotated in the directions of their respective arrows. A primary charger 12, an exposure discharger 13, a flat exposing unit 14, a developing unit 15, a transfer charger 16 and a cleaning unit 17 are orderly arranged along the direction of rotation of the photosensitive drum 11A. Numeral 18 denotes a portion of a light beam scan unit on the left of a condenser lens 9, of an optical system shown in FIG. 10.

A detail of the optical system is shown in FIG. 10. A light beam emanated from a semiconductor laser 23 is collimated by a collimator lens 24 and is caused to impinge a rotating polygon mirror 25 which is rotated at a high speed. The light beam impinging on the rotating polygon mirror 25 is reflected by one 25-1 of the reflecting mirror surfaces of mirror 25 and focused on the photosensitive drum 11A through the condenser lens 19, which serves as focusing means. Thus, the main scan is effected in accordance with a reflection angle of the reflecting mirror surface 25-1 as the rotating polygon mirror 25 is rotated. Sub-scan is effected by the rotation of the photosensitive drum 11A. The signal from the comparator 2 is supplied to the semiconductor laser 23 through a driver, not shown, and an image is formed by the intensity-modulated laser beam on the photosensitive drum 11A.

In order to generate a horizontal synchronizing signal to time a start position of the main scan, the light beam is applied to a light detector 22 through a mirror 21 when the light beam scans slightly outwardly of the start position of the beam main scan. The horizontal synchronizing signal is gneerated when the light is supplied to the light detector 22. A predetermined time after the generation of the horizontal synchronizing signal, the signal from the comparator 2 is supplied to the semiconductor laser 23 through the driver, not shown.

In FIGS. 8 and 9, DC corona discharge is applied to the surface of the rotating photosensitive drum 11A by the primary charger 12 to uniformly and positively or negatively charge the photosensitive material on the surface of the drum 11A. DC corona discharge or AC corona discharge of the opposite polarity to the primary charge is applied to the photosensitive material by the exposure discharger 13, and the light beam main-scanned by the rotating polygon mirror 25 is applied to the photosensitive drum 11A to form an electrostatic latent image on the photosensitive drum 11A. Then, the electrostatic latent image on the photosensitive material is uniformly illuminated by the flat illumination unit 14 such as a fluorescent lamp so that a high surface potential difference is produced between an area on which the light beam impinges and an area to on which it does not impinge to create a high contrast electrostatic latent image on the photosensitive drum 11A.

The high contrast electrostatic latent image is developed by the developing unit 15. The development may be effected by a magnet brush method or a fur brush method. A toner image is electrostatically transferred to a paper wrapped on the transfer drum 11B by the transfer charger 16. The developing unit 15 comprises three units for yellow (Y) 15Y, magenta (M) 15M and cyan (C) 15C (FIG. 9), and one sheet of color image is transferred to the paper wrapped on the transfer drum 11B through three runs of development, that is, three revolutions of the photosensitive drum 11A. After the transfer, the photosensitive drum 11A is cleaned by wiping off the residual toner by means of a roller of the cleaning unit 17.

The laser beam printer shown as an example of the printer 3 has been known per se and hence further description thereof is omitted.

While the laser beam printer has been shown and described as the example of the printer 3, an ink jet printer or a thermal printer may be used.

The dither method of the present embodiment is now explained.

In general, in the dither method and the density pattern method, respective picture elements 38 of an input image are compared with respective elements of a threshold matrix 35 as shown in FIGS. 11A and 11B to determine white or black dots depending on whether the picture elements are larger or smaller than the thresholds, and the resulting dots are supplied to a display screen 36. FIG. 11A illustrates the dither method in which each input picture element 38 is compared with a corresponding one of the elements of the threshold matrix (dither matrix) 35. FIG. 11B illustrates the density pattern method in which each input picture element 38 is compared with all elements of the threshold matrix 35. Thus, in the density pattern method, one picture cell of the input image is represented by a plurality of cells on the display screen 36.

The only difference between the dither method and the density pattern method is that each input picture element is compared with one element of the threshold matrix in the former while it is compared with all elements of the threshold matrix in the latter. Therefore, there is no essential difference therebetween. An intermediate method is possible in which each input picture element is compared with a certain number of elements (for example, 2×2=4 elements in FIG. 11B) of the threshold matrix.

Since there is no essential difference between those method, the dither methods, the density pattern method and the intermediate method are herein referred to collectively as the dither method. The threshold matrix used in the dither method is referred to as the dither matrix.

As explained hereinabove, according to the present invention, since an appropriate one of a plurality of dither matrices having different repetitive array angles can be selected, the Moire pattern is suppressed with a simple construction. The present invention is particularly effective when a text having different screen angles, especially a color text, is to be reproduced.

The present invention is not limited to the illustrated embodiments, and various modifications and variations can be made within the scope of the appended claims.

What is claimed is:

1. An image processing apparatus comprising:
 means for generating image data; and
 means for binary coding the image date from said generating means,
 wherein said binary coding means includes first dither conversion means adapted to store data for first dither conversion and second dither conversion means adapted to store data for second dither conversion,
 said respective data for first and second dither conversions in said first and second dither conversion means corresponding to first and second threshold dither matrices,
 said first and second threshold dither matrices corresponding to first and second colors, respectively, being different from each another in repetitive array angle, and
 said first and second dither conversion means being selected in response to signals associated respectively with said first and second colors.

2. An image processing apparatus according to claim 1 wherein said first dither conversion means includes first storage means for storing a first dither signal and said second dither conversion means includes second storage means for storing a second dither signal.

3. An image processing apparatus according to claim 2 wherein said binary coding means includes a comparator for comparing said image data with a dither signal of a selected dither conversion means.

4. An image processing apparatus according to claim 1 wherein said generating means includes a charge coupled device for reading an original image.

5. An image process apparatus according to claim 1 further comprising a printer for recording an image in accordance with the data binary coded by said binary coding means.

6. An image processing apparatus comprising:
 means for inputting image data; and
 means for binary coding the image data from said input means,
 said binary coding means including dither conversion means for dither converting the image data from said input means,
 said dither conversion means including means storing predetermined first and second threshold matrices for dither conversion, and
 said first and second threshold matrices corresponding to first and second colors, respectively, being different from each another in repetitive array angle, and being selected in response to respective predetermined selection signals.

7. An image processing apparatus according to claim 6, wherein said predetermined selection signals are respectively associated with said first and second colors.

8. An image processing apparatus according to claim 6, wherein said dither conversion means includes a comparator for comparing the image data with a threshold signal of a selected one of said dither matrices.

* * * * *

UNITED STATES PATENT AND TRADEMARK OFFICE
CERTIFICATE OF CORRECTION

PATENT NO. : 4,626,901

DATED : December 2, 1986

INVENTOR(S) : Hiroshi Tanioka

It is certified that error appears in the above-identified patent and that said Letters Patent is hereby corrected as shown below:

Cover page, Attorney, "Cella Harper" should read --Cella, Harper--.

Column 1, line 46, "in which" should read --which--.

Column 2, line 4, "angle a" should read --angle of a--.

Column 2, line 28, "strongest array." should read --"strongest array".--.

Column 2, line 30, "interest" should read --intersect--.

Column 2, lines 30-31 "to and change each other with a certain angle", should read --with each other at a certain angle--.

Column 2, line 48, "andle" should read --angle--.

Column 3, line 4, "A"-A"" should read --A"-A"'--.

Column 4, line 23, "FIG. 3" should read --FIG. 3A--.

Column 6, line 1, "three one of dither" should read --one of three dither--.

Column 6, line 57, "gneerated" should read --generated--.

UNITED STATES PATENT AND TRADEMARK OFFICE
CERTIFICATE OF CORRECTION

PATENT NO. : 4,626,901

DATED : December 2, 1986

INVENTOR(S) : Hiroshi Tanioka

It is certified that error appears in the above-identified patent and that said Letters Patent is hereby corrected as shown below:

Column 7, line 62, "method, the dither methods," should read --methods, the dither method,--.

Column 8, line 12, "date" should read --data--.

Signed and Sealed this

Twenty-eighth Day of April, 1987

Attest:

DONALD J. QUIGG

Attesting Officer      Commissioner of Patents and Trademarks